United States Patent
Yamago et al.

(10) Patent No.: US 8,653,175 B2
(45) Date of Patent: Feb. 18, 2014

(54) TERMINALLY MODIFIED ACRYLIC POLYMER AND METHOD FOR PRODUCING TERMINALLY MODIFIED ACRYLIC POLYMER

(75) Inventors: Shigeru Yamago, Kyoto (JP); Hiroji Fukui, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/568,532

(22) Filed: Aug. 7, 2012

(65) Prior Publication Data

US 2013/0066003 A1    Mar. 14, 2013

Related U.S. Application Data

(62) Division of application No. 12/734,805, filed as application No. PCT/JP2008/071713 on Nov. 28, 2008, now abandoned.

(30) Foreign Application Priority Data

Nov. 28, 2007 (JP) .................. 2007-307489

(51) Int. Cl.

| C08L 33/12 | (2006.01) |
|---|---|
| C08K 3/04 | (2006.01) |
| C08K 3/22 | (2006.01) |
| C08K 3/40 | (2006.01) |
| C08L 33/10 | (2006.01) |
| C08K 3/08 | (2006.01) |

(52) U.S. Cl.
USPC ........... 524/403; 524/413; 524/432; 524/434; 524/560; 525/910

(58) Field of Classification Search
USPC .................. 524/556, 560; 525/910
See application file for complete search history.

(56) References Cited

U.S. PATENT DOCUMENTS

| 5,587,431 | A * | 12/1996 | Gridnev et al. ............... 525/269 |
| 7,591,921 | B2 * | 9/2009 | Fukui et al. ................... 156/711 |
| 8,138,252 | B2 * | 3/2012 | Oomura et al. ............... 524/424 |

FOREIGN PATENT DOCUMENTS

| JP | 10-167836 | 6/1998 |
| JP | 11-71132 | 3/1999 |
| JP | 2000-72816 | 3/2000 |
| JP | 2002-80675 | 3/2002 |
| JP | 2003-335814 | 11/2003 |
| JP | 2004-79480 | 3/2004 |
| WO | 2006/090728 | 8/2006 |

OTHER PUBLICATIONS

Lewis E. Manring, Macromolecules, vol. 22, No. 6, pp. 2673-2677, 1989.

T. Kashiwagi et al., "Effects of Weak Linkages on the Thermal and Oxidative Degradation of Poly(methyl methacrylates)", Macromolecules, vol. 19, pp. 2160-2168, 1986.

Akihiko Fukada et al, "Novel Photo Curable Material for Binder with Excellent Thermal Degradation Property" Dai 15 Kai Polymer Material Forum Yokoshu, 2006, p. 204.

* cited by examiner

Primary Examiner — Vu A Nguyen
(74) Attorney, Agent, or Firm — Wenderoth, Lind & Ponack, L.L.P.

(57) ABSTRACT

The present invention provides a terminally modified acrylic polymer having excellent thermal decomposition properties at low temperatures, an inorganic fine particle dispersed paste composition obtained by using the terminally modified acrylic polymer and a method of producing of the terminally modified acrylic polymer.

6 Claims, 2 Drawing Sheets

TERMINALLY MODIFIED ACRYLIC POLYMER AND METHOD FOR PRODUCING TERMINALLY MODIFIED ACRYLIC POLYMER

This is a divisional of Ser. No. 12/734,805, filed Jul. 14, 2010 now abandoned, which is a U.S. national stage of International Application No. PCT/JP2008/071713 filed Nov. 28, 2008.

TECHNICAL FIELD

The present invention relates to a terminally modified acrylic polymer having excellent thermal decomposition properties at low temperatures, an inorganic fine particle dispersed paste composition obtained by using the terminally modified acrylic polymer and a method of producing of the terminally modified acrylic polymer.

BACKGROUND ART

In recent years, paste compositions formed by dispersing inorganic fine particles such as conductive powder, ceramic powder and the like in a binder resin are employed in order to obtain sintered, bodies having various shapes. Particularly, a paste composition formed by dispersing a phosphor as fine particles in a resin binder is used, for example, in plasma displays (PDP), field emission displays (FED, SED), and the like, and in recent years, its demand is being increased. Also in the case of a paste composition formed by dispersing glass frits in a resin binder, a resin for a lead-free frit glass, which does not impair conventional handling and has a lower decomposition temperature than that of a resin for a conventional lead frit glass, is being required. Moreover, demands for uses of conductive paste for wiring, which uses a silver powder having a low sintering temperature, is growingly increased.

As the binder resin used for such an inorganic fine particle dispersed paste composition, a cellulose type resin such as ethyl cellulose from which a paste excellent in a screen printing property can be obtained is commonly employed. However, when considering a process in which inorganic fine particles are dispersed, a pattern is printed by screen printing, and degreasing and burning are performed to obtain an inorganic fine particle layer, since cellulose type resins have poor thermal decomposition properties, they have to be degreased at elevated temperatures and therefore they have problems that large energy is required in a production step or it takes much time to burn. Furthermore, when a cellulose type resin is used as a binder resin of a paste in which glass frits are dispersed, there is a problem that a carbon derived from a resin remains in a sintered body since in the step of sintering glass frits, sintering of the glass frit starts before the resin is decomposed and removed.

For this problem, in Patent Document 1, a paste composition obtained by using an acrylic resin having excellent thermal decomposition properties is disclosed. An inorganic fine particle dispersed paste composition containing such an acrylic resin can be burnt at low temperatures in a short time since its binder resin has good thermal decomposition properties.

However, even in such a case, when low melting point glasses having a softening point of 400° C. or lower or inorganic fine particles such as conductive fine particles of copper or silver, which are prone to being oxidized by sintering, are used, decomposition at lower temperatures is required.

Patent Document 1: Japanese Kokai Publication Hei-11-71132 (JP-A H11-71132)

DISCLOSURE OF THE INVENTION

Problems to be Solved by the Invention

In view of the above description, it is an object of the present invention to provide a terminally modified acrylic polymer having excellent thermal decomposition properties at low temperatures, an inorganic fine particle dispersed paste composition obtained by using the terminally modified acrylic polymer and a method of producing of the terminally modified acrylic polymer.

Means for Solving the Problems

The present invention is a terminally modified acrylic polymer, which contains a main chain composed of a repeating unit represented by the following formula (1), and a group represented by the following formula (2) at both ends or one end of the main chain.

[Formula 1]

In the above formulas, $R^1$ represents hydrogen atom, an organic group having 1 or more carbon atoms or a derivative of an organic group having 1 or more carbon atoms; $R^2$ represents an organic group having 1 or more carbon atoms or a derivative of an organic group having 1 or more carbon atoms; $R^3$ and $R^4$ each represents hydrogen atom, an organic group having 1 or more carbon atoms or a derivative of an organic group having 1 or more carbon atoms; and n represents a positive integer.

Hereinafter, the present invention will be described in detail.

The terminally modified acrylic polymer of the present invention has a main chain comprising repeating units represented by the above formula (1).

$R^1$ in the formula (1) is hydrogen atom, an organic group having 1 or more carbon atoms or a derivative of an organic group having 1 or more carbon atoms.

Examples of the organic group having 1 or more carbon atoms or the derivative of an organic group having 1 or more carbon atoms, used in the $R^1$, include straight chain, branched chain or cyclic alkyl groups having 1 to 8 carbon atoms, such as methyl group, ethyl group, n-propyl group, isopropyl group, cyclopropyl group, n-butyl group, sec-butyl group, tert-butyl group, cyclobutyl group, n-pentyl group, n-hexyl group, n-heptyl group, n-octyl group, and the like, and derivatives thereof. Among these groups, straight chain or branched chain alkyl groups having 1 to 4 carbon atoms are preferred, and methyl group or ethyl group are more preferred.

Among these, it is preferred that the $R^1$ is methyl group and the formula (1) is a segment derived from a methacrylic ester.

$R^2$ in the formula (1) is an organic group having 1 or more carbon atoms or a derivative of an organic group having 1 or more carbon atoms. When the organic group has 0 carbon atom, since the terminally modified acrylic polymer is (meth) acrylic acid polymer which is a polycarboxylic acid, there is a problem that it is difficult to dissolve the terminally modified acrylic polymer or a solvent in which the terminally modified acrylic polymer is dissolved is limited.

Examples of the organic group having 1 or more carbon atoms or the derivative of the organic group having 1 or more carbon atoms, used in the $R^2$, include methyl group, ethyl group, n-propyl group, isopropyl group, cyclopropyl group, n-butyl group, sec-butyl group, tert-butyl group, isobutyl group, cyclobutyl group, n-pentyl group, n-hexyl group, cyclohexyl group, n-heptyl group, n-octyl group, 2-ethylhexyl group, n-nonyl group, n-dodecyl group, behenyl group, stearyl group, isomyristyl group, isoboronyl group, phenyl group, benzyl group, 2-hydroxyethyl group, 2-hydroxypropyl group, 2,3-dihydropropyl group, 4-hydroxybutyl group, 4-hydroxymethyl group, phenyl group, 4-methylphenyl group, 3-methylphenyl group, 2-methylphenyl group, 4-hydroxyphenyl group, 4-acetoxyphenyl group, 4-tert-butoxyphenyl group, and the like, and derivatives thereof.

As an alkyl group having 1 or more carbon atoms or a derivative of an alkyl group having 1 or more carbon atoms, used in the $R^2$, the same one as in the $R^1$ may be used. In addition, $R^1$ and $R^2$ may be the same or may be different from each other.

When the terminally modified acrylic polymer of the present invention is used for an inorganic fine particle dispersed paste composition, a terminally modified acrylic polymer in which $R^2$ is an alkyl group having 1 to 8 carbon atoms is preferably used. Thereby, thermal decomposition derived from a main chain structure of a resin can be expected, and an inorganic fine particle dispersed paste composition having an excellent decomposition property of a binder can be prepared. When the alkyl group has more than 8 carbon atoms, decomposition properties of the binder may be deteriorated due to the thermal decomposition properties of a side chain alkyl group.

The terminally modified acrylic polymer of the present invention has a group represented by the above formula (2) at both ends or one end of the main chain. By having the group represented by the formula (2) at both ends or one end, since thermal decomposition starts from an end of the molecule of the terminally modified acrylic polymer of the present invention in heating the terminally modified acrylic polymer, the terminally modified acrylic polymer of the present invention can be a resin which is promptly decomposed at low temperatures and is extremely superior in a thermal decomposition property.

$R^3$ and $R^4$ in the formula (2) are hydrogen atom, an organic group having 1 or more carbon atoms or a derivative of an organic group having 1 or more carbon atoms.

Examples of the $R^3$ and $R^4$ include hydrogen atom, methyl group, ethyl group, n-propyl group, isopropyl group, cyclopropyl group, n-butyl group, sec-butyl group, tert-butyl group, isobutyl group, cyclobutyl group, n-pentyl group, n-hexyl group, cyclohexyl group, n-heptyl group, n-octyl group, 2-ethylhexyl group, n-nonyl group, n-dodecyl group, behenyl group, stearyl group, isomyristyl group, isoboronyl group, phenyl group, benzyl group, 2-hydroxyethyl group, 2-hydroxypropyl group, 2,3-dihydropropyl group, 4-hydroxybutyl group, 4-hydroxymethyl group, phenyl group, 4-methylphenyl group, 3-methylphenyl group, 2-methylphenyl group, 4-hydroxyphenyl group, 4-acetoxyphenyl group, and 4-tert-butoxyphenyl group. Substituents such as hydrogen atom, methyl group, ethyl group, n-propyl group, isopropyl group and cyclopropyl group can be suitably used from the viewpoint of ease of terminal modification. Among these, hydrogen atom is particularly preferable.

As the $R^3$ and the $R^4$, the same functional group may be used or different functional groups may be used.

A preferred lower limit of the number average molecular weight on the polystyrene equivalent basis of the terminally modified acrylic polymer of the present invention is 2000 and a preferred upper limit is 1000000. When the above number average molecular weight is less than 2000, sufficient viscosity may not be attained for example when the terminally modified acrylic polymer of the present invention is used as a binder resin of a paste composition. When the number average molecular weight is more than 1000000, an adhesive force may be too strong or the application of the acrylic polymer may be difficult due to significant increase in viscosity for example when the terminally modified acrylic polymer of the present invention is used as a binder resin of a paste composition. A more preferred upper limit of the number average molecular weight is 500000.

In addition, in the present specification, the number average molecular weight is a value found on the polymethyl methacrylate equivalent basis measured by gel permeation chromatography (GPC).

When the terminally modified acrylic polymer of the present invention is used for an inorganic fine particle dispersed paste composition, the number average molecular weight of the acrylic polymer is preferably 2000 to 500000. Thereby, it becomes easy to prepare an inorganic fine particle dispersed paste composition which is superior in handling. When the number average molecular weight is less than 2000, the viscosity of the prepared paste is significantly low, and therefore, the dispersion stability of the inorganic fine particle may be impaired. When the number average molecular weight is more than 500000, the viscosity of an inorganic fine particle dispersed paste composition to be obtained may be significantly high, and the application of the paste composition to a process such as printing or coating may be difficult.

A preferred upper limit of a molecular weight distribution (PDI=Mw/Mn) of the terminally modified acrylic polymer of the present invention is 2.0. When the molecular weight distribution is more than 2.0, the acrylic polymer may tend to be stringy and may be hard to handle when the acrylic polymer is used in a paste.

Examples of a method of producing the terminally modified acrylic polymer of the present invention include a method comprising a step of reacting a living radical polymerization initiator represented by the following formula (3-1) or (3-2) with an acrylic monomer represented by the following formula (4) to prepare an acrylic polymer and a step of reacting the acrylic polymer with a nitroxyl radical represented by the following formula (5) or (6) to modify both ends or one end of the acrylic polymer through olefination by hydrogen abstraction from an alkyl group of α position, and a method comprising a step of reacting the acrylic polymer with diselenide such as diphenyl diselenide instead of nitroxyl radical to obtain a polymer with terminal selenium and reacting the obtained polymer with an oxidizing agent such as hydrogen peroxide.

Among these methods, the method comprising a step of reacting a living radical polymerization initiator represented by the following formula (3-1) or (3-2) with an acrylic monomer represented by the following formula (4) to prepare an acrylic polymer, and a step of reacting the acrylic polymer with a nitroxyl radical represented by the following formula (5) or (6) to modify both ends or one end of the acrylic polymer is preferable. Such a method of producing a terminally modified acrylic polymer also constitutes the present invention.

[Formula 2]

In the above formulas, $R^5$ to $R^{12}$ represent hydrogen atom, an organic group having 1 or more carbon atoms or a derivative of an organic group having 1 or more carbon atoms, $R^{13}$ represents a derivative of a divalent organic group having 3 or more carbon atoms, and X represents Bi, Te, Sb or iodine. In addition, when X is iodine, X is not replaced with $R^6$.

Examples of the organic group having 1 or more carbon atoms or the derivative of the organic group having 1 or more carbon atoms, used in the $R^5$ to $R^{12}$, include a methyl group, ethyl group, n-propyl group, isopropyl group, cyclopropyl group, n-butyl group, sec-butyl group, tert-butyl group, isobutyl group, cyclobutyl group, n-pentyl group, n-hexyl group, cyclohexyl group, n-heptyl group, n-octyl group, 2-ethylhexyl group, n-nonyl group, n-dodecyl group, behenyl group, stearyl group, isomyristyl group, isoboronyl group, phenyl group, benzyl group, 2-hydroxyethyl group, 2-hydroxypropyl group, 2,3-dihydropropyl group, 4-hydroxybutyl group, 4-hydroxymethyl group, phenyl group, 4-methylphenyl group, 3-methylphenyl group, 2-methylphenyl group, 4-hydroxyphenyl group, 4-acetoxyphenyl group, 4-tert-butoxyphenyl group. As the $R^5$ to $R^{12}$, different functional groups may be used or the same functional group may be used in combination.

In the step of reacting a living radical polymerization initiator represented by the above formula (3-1) or (3-2) with an acrylic monomer represented by the formula (4) to prepare an acrylic polymer, for example, the living radical polymerization initiator represented by the formula (3-1) or (3-2) is mixed with the acrylic monomer represented by the formula (4) in a container, the inside of which is replaced with an inert gas. Examples of the inert gas include nitrogen, argon, helium, and the like. Among these gases, argon and nitrogen are preferred.

Incidentally, this step is described in detail in Japanese Journal of Polymer Science and Technology (Kobunshi Ronbun shu), vol. 64, p 329, 2007 and its cited references.

The proportion between the living radical polymerization initiator represented by the above formula (3-1) or (3-2) and the acrylic monomer represented by the formula (4) may be appropriately adjusted depending on a molecular weight or a molecular weight distribution of an acrylic polymer to be obtained, but it is preferred to add 20 to 100000 mol of the acrylic monomer represented by the formula (4) to 1 mol of the living radical polymerization initiator represented by the formula (3-1) or (3-2).

Preparation of the acrylic polymer is generally performed without using a solvent, but an organic solvent which is commonly used in radical polymerization may be used. Examples of the organic solvent include benzene, toluene, xylene, anisole, N,N-dimethylformamide (DMF), dimethyl sulfoxide (DMSO), acetone, methyl ethyl ketone, methyl isobutyl ketone, tetrahydrofuran (THF), ethyl acetate, butyl acetate, trifluoromethylbenzene, butyl carbitol, butyl carbitol acetate, terpineol, dihydroterpineol, texanol, pentane, hexane, cyclohexane, methylcyclohexane, cyclohexanone, and dioctyl phthalate. Further, an aqueous solvent can also be used, and examples of the aqueous solvent include water, methanol, ethanol, isopropanol, n-butanol, ethyl cellosolve, butyl cellosolve, and 1-methoxy-2-propanol.

Next, in the step of preparing the acrylic polymer, a mixture comprising the living radical polymerization initiator represented by the formula (3-1) or (3-2) and the acrylic monomer represented by the formula (4) is stirred. A reaction temperature and a reaction time may be appropriately adjusted depending on a molecular weight or a molecular weight distribution of an acrylic polymer to be obtained, but it is preferred that the mixture is generally stirred at a temperature of 60 to 150° C. for 5 to 100 hours, and it is preferred that the mixture is stirred at a temperature of 80 to 120° C. for 10 to 30 hours. In this case, a pressure at the time of reaction is usually a normal pressure, but pressurized condition or a reduced pressure may be employed.

After the completion of the reaction, a resin is isolated by removing the used solvent and the residual monomer under a reduced pressure by a normal method, and by taking out the resulting resin or using a solvent in which the resin is not dissolved to perform reprecipitation.

In the method of producing a terminally modified acrylic polymer of the present invention, plural kinds of acrylic monomers may be used. For example, when two or more kinds of acrylic monomers are simultaneously reacted with each other, a random copolymer can be obtained. Further, by reacting different kinds of acrylic monomers sequentially, a block copolymer can be obtained.

Examples of the living radical polymerization initiator represented by the formula (3-1) or (3-2) include methyl 2-methyl-2-dimethylbismuthanyl propionate, 2-methyl-2-diphenylbismuthanyl propionitrile, 2-methyl-2-dimethylphenylbismuthanyl propionitrile, methyl 2-methyl-2-dimethylstibanyl propionate, 2-methyl-2-dimethylstibanyl propionitrile, 1-dimethylstibanyl-1-phenyl ethane, ethyl 2-methyl-2-methyltellanyl propionate, ethyl 2-n-butyl-2-phenyltellanyl propionate, ethyl 2-methyl-2-phenyltellanyl propionate, 2-methyl-2-methyltellanyl propionitrile, 1-methyltellanyl-1-phenyl ethane, and 1-phenyltellanyl-1-phenyl ethane.

Examples of the acrylic monomer represented by the above formula (4) include methyl (meth)acrylate, ethyl (meth)acrylate, n-propyl (meth)acrylate, isopropyl (meth)acrylate, cyclopropyl (meth)acrylate, n-butyl (meth)acrylate, sec-butyl (meth)acrylate, tert-butyl (meth)acrylate, isobutyl (meth)acrylate, cyclobutyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, n-nonyl (meth)acrylate, n-dodecyl (meth)acrylate, behenyl (meth)acrylate, stearyl (meth)acrylate, isomyristyl (meth)acrylate, isoboronyl (meth)acrylate, phenyl (meth) acrylate, benzyl (meth)acrylate, 2-hydroxyethyl (meth)acrylate, 2-hydroxypropyl (meth)acrylate, 2,3-dihydropropyl (meth)acrylate, 4-hydroxybutyl (meth)acrylate, 4-hydroxymethyl (meth)acrylate, phenyl (meth)acrylate, 4-methylphenyl (meth)acrylate, 3-methylphenyl (meth)acrylate, 2-methylphenyl (meth)acrylate, 4-hydroxyphenyl (meth) acrylate, 4-acetoxyphenyl (meth)acrylate, and 4-tert-butoxyphenyl (meth)acrylate, polymethyl methacrylate with terminal (meth)acryloyl, polyethylene glycol mono(meth)acrylic ester, polypropylene glycol mono(meth)acrylic ester, polytetramethylene glycol mono(meth)acrylic ester, and polydimethylsiloxane mono(meth)acrylic ester. Among these, alkyl methacrylate, particularly, methyl methacrylate, ethyl methacrylate, isobutyl methacrylate, cyclohexyl methacrylate, 2-ethylhexyl methacrylate, and lauryl methacrylate are preferred. Further, random copolymerization, block copolymerization, multi-block copolymerization, or alternative copolymerization may be performed by use of these plural kinds of acrylic monomers. When performing these copolymerization processes, it is preferable to select an acrylic monomer having excellent thermal decomposition properties.

Furthermore, a vinyl monomer may be copolymerized for the purpose of imparting other properties. Examples of the vinyl monomer include styrene, α-methyl styrene, p-methyl styrene, maleic anhydride, maleimide, (meth)acrylamide, N-(meth)acryloylmorpholine, (meth)acrylonitrile, and N-isopropyl (meth)acrylamide.

In the method of producing an terminally modified acrylic polymer of the present invention, next, the step of reacting the obtained acrylic polymer with a nitroxyl radical represented by the above formula (5) or (6) to modify both ends or one end of the above acrylic polymer through olefination by hydrogen abstraction from an alkyl group of α position is performed.

In the step of modifying the end, a method of modifying both ends or one end of the acrylic polymer is not particularly limited and publicly known methods can be employed. For example, a method, in which a predetermined amount of the acrylic polymer and the nitroxyl radical represented by the formula (5) or (6) are put in an organic solvent such as benzene to react them, are employed.

Examples of the nitroxyl radical represented by the above formula (5) or (6) include N,N-di-tert-butylamine-N-oxy, N-amyl-N-tert-butylamine-N-oxy, N-tert-butyl-N-[1-diethylphosphono-(2,2-dimethylpropyl)]-amine-N-oxy, N-tert-butyl-N-(1-phenyl-2-methyl)propylamine-N-oxy, N-tert-butyl-N-(1-tert-butyl-2-ethylsulfinyl)propylamine-N-oxy, 2,2,6,6-tetramethylpiperidine-1-oxy, 2,2,6,6-tetraethyl-4-oxopiperidine-1-oxy, 2,6-bis(tert-butyldimethyl)siloxy-2,6-diethylpiperidine-1-oxy, and 2,2,10,10-tetraethylisoindoline-N-oxy. These nitroxyl radicals may be used alone or in combination of two or more kinds.

An amount of the nitroxyl radical represented by the above formula (5) or (6) to be added may be appropriately adjusted depending on properties of the terminally modified acrylic polymer to be obtained, but it is preferred to add 0.8 to 3.0 mol of the nitroxyl radical represented by the formula (5) or (6) to 1 mol of the acrylic polymer.

An inorganic fine particle dispersed paste composition containing the terminally modified acrylic polymer of the present invention, an organic solvent, and an inorganic fine particle also constituted the present invention.

The organic solvent is not particularly limited and examples thereof include ethylene glycol ethyl ether, ethylene glycol monobutyl ether, ethylene glycol monoethyl ether acetate, butyl carbitol, butyl carbitol acetate, isophorone, butyl formate, butyl lactate, butyl acetate, isobutyl acetate, tert-butyl acetate, propyl acetate, isopropyl acetate, ethyl acetate, dioctyl phthalate, dibutyl phthalate, dioctyl adipate, dibutyl adipate, benzyl alcohol, phenyl propylene glycol, terpineol, terpinolene, dihydroterpineol, α-pinene, β-pinene, limonene, toluene, xylene, mesitylene, cresol, acetone, methyl ethyl ketone, methyl isobutyl ketone, cyclohexanone, 2,4-pentanedione, methanol, ethanol, isopropyl alcohol, 1-propanol, 1-butanol, 2-butanol, isobutyl alcohol, tert-butyl alcohol, cyclohexanol, amyl alcohol, 2-ethylhexyl alcohol, 1-octyl alcohol, ethylene glycol, diethylene glycol, triethylene glycol, propylene glycol, dipropylene glycol, tripropylene glycol, 1,4-butanediol, glycerin, hexane, cyclohexane, methylcyclohexane, heptane, octane, isooctane, 2-ethylhexane, nonane, decane, and decalin.

Among these, butyl carbitol, butyl carbitol acetate, and terpineol are suitably used since they are superior in the solubility of binder resin comprising a (meth)acrylic resin therein and in the viscosity control. These organic solvents may be used alone or in combination of two or more kinds.

As the above organic solvent, a solvent, in which a boiling point at 1 atm is lower than 400° C., is preferably employed so that the paste composition can be burnt at low temperatures, more preferably, a boiling point at 1 atm is lower than 350° C., and furthermore preferably, a boiling point at 1 atm is lower than 300° C. Moreover, a solvent in which a boiling point at 1 atm is at least 100° C. or higher is preferable in order to inhibit changes in a solid content or changes in viscosity due to solvent volatilization during use and storage of the paste. The boiling point at 1 atm is more preferably 150° C. or higher. It is particularly preferred that the boiling point at 1 atm is 100 to 290° C. When the boiling point is lower than 100° C., disadvantages that a solvent is volatilized during storage of the paste composition and therefore viscosity is not stable or the surface causes drying may occur. When the boiling point is higher than 290° C., there is a problem that it is difficult to adequately dry an applied substance in a dryer such as an oven, or a problem that an applied substance is thermally degraded if a drying temperature is increased in order to adequately dry the applied substance.

Examples of the inorganic fine particle include metal powders such as a gold powder, a silver powder, a copper powder, a nickel powder, a platinum powder, a palladium powder, and the like; powders of metal oxides such as silica, alumina, zirconia, titania, zinc oxide, magnesia, ferrite, ITO, and the like; frits of glasses such as soda glass, alkali-free glass, lead borosilicate glass, bismuth borosilicate, zinc borosilicate glass, and the like; powders of nitrides such as aluminum nitride, silicon nitride, boron nitride, and the like; a phosphor powder, a silicon carbide powder, a barium titanate powder, and a carbon powder. Among these fine particles, a glass frit, a phosphor powder, a silver powder, a copper powder, an ITO powder, a zinc oxide powder and a carbon powder are preferable.

Effect of the Invention

In accordance with the present invention, it is possible to provide a terminally modified acrylic polymer having excellent thermal decomposition properties at low temperatures, an inorganic fine particle dispersed paste composition obtained by using the terminally modified acrylic polymer and a method of producing of the terminally modified acrylic polymer.

BEST MODE FOR CARRYING OUT THE INVENTION

Hereinafter, the present invention will be described in more detail by way of examples, but the present invention is not limited to these examples.

Example 1

Production of Acrylic Polymer 30 mol of methyl methacrylate (manufactured by Wako Pure Chemical Industries, Ltd.) as a monomer was added to 1 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 0.2 g of 2,2,6,6-tetramethylpiperidine 1-oxyl (TEMPO manufactured by Aldrich Chemical Co.) was further added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain a terminally modified acrylic polymer (conversion rate 97%).

The obtained terminally modified acrylic polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Figure 2:
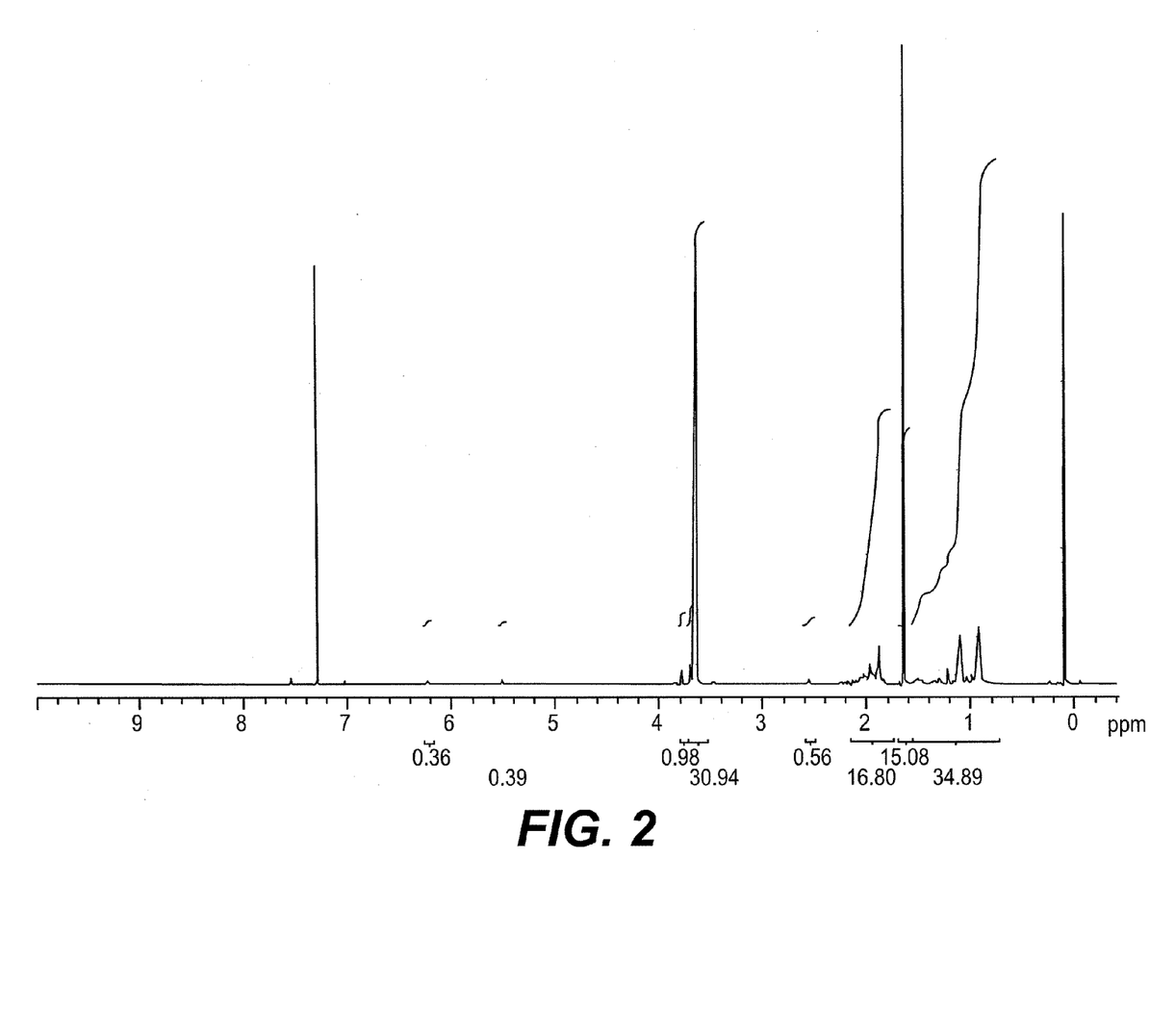
FIG. 2 is an NMR spectrum of the terminally modified acrylic polymer obtained in Example 1.

Further, an NMR spectrum of the obtained terminally modified acrylic polymer is shown in FIG. 2. From the NMR spectrum shown in FIG. 2, it is found that a polymer having a terminal olefin is prepared.

In addition, the organic bismuth compound as a living radical polymerization initiator was prepared based on the reference (S. Yamago, E. Kayahara, M. Kotani, B. Ray, Y. Kwak, A. Goto and T. Fukuda, Angew. Chem. Int. Ed., 46, p 1304-1306 (2007)).

Example 2

Production of Acrylic Polymer 30 mol of isobutyl methacrylate (manufactured by Wako Pure Chemical Industries, Ltd.) as a monomer was added to 1 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 0.2 g of 2,2,6,6-tetramethylpiperidine 1-oxyl (TEMPO manufactured by Aldrich Chemical Co.) was further added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain a terminally modified acrylic polymer (conversion rate 95%).

Further, the obtained terminally modified acrylic polymer was measured by NMR, and consequently, it could be verified that the acrylic polymer had a functional group represented by the formula (2) at the end.

The obtained terminally modified acrylic polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Example 3

Production of Acrylic Polymer

A mixture solution of 15 mol of isobutyl methacrylate (manufactured by Wako Pure Chemical Industries, Ltd.) and 15 mol of isobutyl methacrylate (manufactured by Wako Pure Chemical Industries, Ltd.) as a monomer was added to 1 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 0.2 g of 2,2,6,6-tetramethylpiperidine 1-oxyl (TEMPO manufactured by Aldrich Chemical Co.) was further added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain a terminally modified acrylic polymer (conversion rate 96%).

Further, the obtained terminally modified acrylic polymer was measured by NMR, and consequently, it could be verified that the acrylic polymer had a functional group represented by the formula (2) at the end.

The obtained terminally modified acrylic polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Example 4

Production of Acrylic Polymer

A mixture solution of 30 mol of isobutyl methacrylate (manufactured by Wako Pure Chemical Industries, Ltd.) as a monomer was added to 0.05 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 0.2 g of 2,2,6,6-tetramethylpiperidine 1-oxyl (TEMPO manufactured by Aldrich Chemical Co.) was further added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain a terminally modified acrylic polymer (conversion rate 97%).

Further, the obtained terminally modified acrylic polymer was measured by NMR, and consequently, it could be verified that the acrylic polymer had a functional group represented by the formula (2) at the end.

The obtained terminally modified acrylic polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Example 5

Production of Acrylic Polymer

A mixture solution of 30 mol of isobutyl methacrylate (manufactured by Wako Pure Chemical Industries, Ltd.) as a monomer was added to 0.001 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 0.2 g of 2,2,6,6-tetramethylpiperidine 1-oxyl (TEMPO manufactured by Aldrich Chemical Co.) was further added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain a terminally modified acrylic polymer (conversion rate 93%).

Further, the obtained terminally modified acrylic polymer was measured by NMR, and consequently, it could be verified that the acrylic polymer had a functional group represented by the formula (2) at the end.

The obtained terminally modified acrylic polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Comparative Example 1

Production of Acrylic Polymer 30 mol of methyl methacrylate (manufactured by Wako Pure Chemical Industries, Ltd.) as a monomer was added to 1 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of a reaction, the reaction solution was dissolved in 15 mL of $\alpha,\alpha,\alpha$-trifluorotoluene. To the resulting solution, 1.2 mol of tributyltin hydride and 0.1 mol of AIBN were added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain an acrylic polymer with terminal hydrogen-modified (conversion rate 97%).

The obtained polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Comparative Example 2

Production of Acrylic Polymer 30 mol of methyl methacrylate (manufactured by Wako Pure Chemical Industries, Ltd.) as a monomer was added to 1 mol of an organic bismuth compound $CH_3C(CH_3)(Bi(CH_3)_2)COOCH_3$ as a living radical polymerization initiator, and then, the resulting mixture was heated to 100° C. while stirring the mixture with a stirrer and maintained at this temperature for 3 hours. After the completion of the reaction, the reaction solution was dissolved in 15 mL of $\alpha,\alpha,\alpha$-trifluorotoluene. To the resulting solution, 1.2 mol of tributyltin deuteride and 0.1 mol of AIBN were added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain an acrylic polymer with terminal deuterium-modified (conversion rate 97%).

The obtained polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Comparative Example 3

Production of Acrylic Polymer 30 mol of methyl methacrylate (manufactured by Wako Pure Chemical Industries, Ltd.) as a monomer was added to 1 mol of an organic bismuth compound $CH_3C(CH_3)(Bi(CH_3)_2)CN$ as a living radical polymerization initiator, and then, the resulting mixture was heated to 100° C. while stirring the mixture with a stirrer and maintained at this temperature for 3 hours. After the completion of the reaction, the reaction solution was dissolved in 15 mL of $\alpha,\alpha,\alpha$-trifluorotoluene. To the resulting solution, 1.2 mol of tributyltin deuteride and 0.1 mol of AIBN were added and the resulting mixture was reacted at 80° C. for 1 hour. After the completion of a reaction, the resulting solution was charged into 250 mL of hexane (manufactured by Wako Pure Chemical Industries, Ltd.) being stirred. Thereafter, a precipitated polymer was filtered under suction and dried to obtain an acrylic polymer in which an $\alpha$ end is 2-cyanopropyl-2-yl and an $\omega$ end is deuterium-modified (conversion rate 97%).

The obtained polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

Comparative Example 4

Production of Acrylic Polymer

In a 1 liter three neck flask equipped with a reflux tube, 50 g of methyl methacrylate as a monomer and 350 g of toluene as a solvent were mixed and stirred, and the resulting mixture was heated to a temperature at which a reflux was initiated. After the reflux, a solution formed by dissolving 10 g of AIBN (azobisisobutyronitrile) in 20 g of toluene was added to initiate polymerization. A temperature of the resulting mixture was cooled to room temperature after a lapse of three hours from the start of polymerization and thereby an acrylic polymer, in which a polymerization end is unknown, was prepared by a free radical polymerization method.

The obtained polymer was analyzed by gel permeation chromatography (GPC) using LF-804 Column manufactured by SHOKO Co., Ltd. as a column to determine a number average molecular weight on the polymethyl methacrylate equivalent basis and a molecular weight distribution (PDI=Mw/Mn). The results are shown in Table 1.

<Evaluation>

The acrylic polymers obtained in Examples 1 to 5 and Comparative Examples 1 to 4 were evaluated by the following method.

(Evaluation of Decomposition Properties (TG-DTA Evaluation))

Using a thermal decomposing apparatus ("simultaneous SDT 2960" manufactured by TA Instruments Co., Ltd.), the acrylic polymers obtained in Examples 1 to 5 and Comparative Examples 1 to 4 were heated to 500° C. at a temperature rising rate of 10° C./min in an air atmosphere, and a temperature at which 50% by weight of the initial weight of the acrylic polymer is decomposed, and a ratio of the acrylic polymer remaining when the temperature of the acrylic polymer reaches 300° C. were measured, and the results are shown in Table 1.

Figure 1:
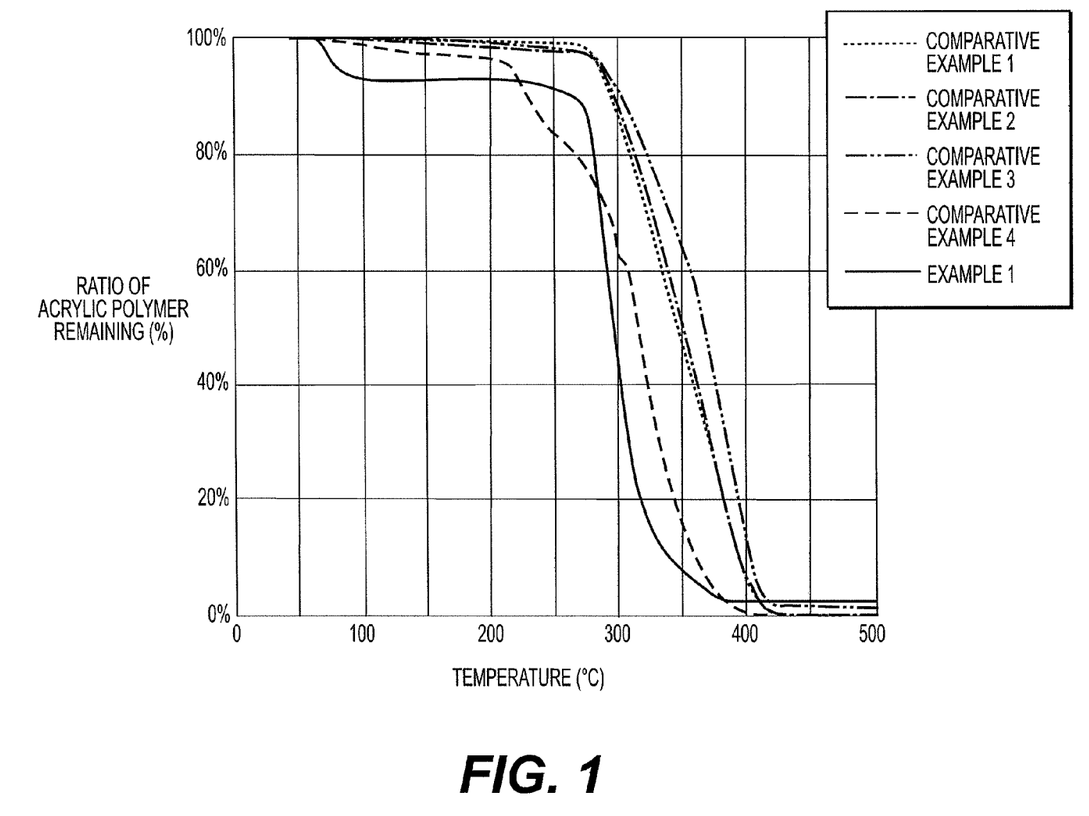
FIG. 1 is a graph of thermal decomposition behavior on acrylic polymers obtained in Example 1 and Comparative Examples 1 to 4 measured by using a thermal decomposing apparatus.

Further, thermal decomposition behaviors at this time of Example 1 and Comparative Examples 1 to 4 are shown in FIG. 1.

As shown in FIG. 1, in the terminally modified acrylic polymer obtained in Example 1, a temperature at which most of the resin was decomposed was lower than those of the terminally modified acrylic polymers obtained in Comparative Examples and particularly a thermal decomposition property at a temperature of about 300° C. was extremely high. On the other hand, the acrylic polymers obtained in Comparative Examples 1 to 4 had poor thermal decomposition properties and most of the resins were not decomposed at a temperature of about 300° C.

Example 6

Production of Inorganic Fine Particle Dispersed Paste Composition 5 g of the terminally modified acrylic polymer obtained in Example 1 was dissolved in 10 g of toluene (manufactured by Wako Pure Chemical Industries, Ltd., boiling point 110° C.). To the resulting solution, 80 g of silver powder (manufactured by MITSUI MINING & SMELTING Co., Ltd., average particle diameter 2 μm) was added, and then, the resulting mixture was mixed and stirred until it becomes homogeneous by a planetary mixing and defoaming machine to obtain a silver paste.

Evaluation of Sintering Property

The obtained silver paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 450° C. for 10 minutes in a muffle furnace. Thereafter, silver was recovered and carbon residue was measured by a total carbon/total sulfur measuring apparatus to yield a carbon content of 32 ppm (result is shown in Table 2).

Example 7

Production of Inorganic Fine Particle Dispersed Paste Composition 5 g of the terminally modified acrylic polymer obtained in Example 1 was dissolved in 10 g of terpineol (manufactured

|  | | | | Evaluation | |
| --- | --- | --- | --- | --- | --- |
|  | Conversion rate (%) | Number average molecular weight. (Mn) | Molecular weight distribution (PDI) | Temperature at which 50% by weight of the acrylic polymer is decomposed (° C.) | Ratio of acrylic polymer remaining when reaching 300° C. (%) |
| Example 1 | 97 | 2900 | 1.12 | 290 | 41 |
| Example 2 | 95 | 3400 | 1.14 | 260 | 85 |
| Example 3 | 96 | 3200 | 1.13 | 280 | 71 |
| Example 4 | 97 | 52400 | 1.12 | 280 | 41 |
| Example 5 | 93 | 349000 | 1.12 | 290 | 45 |
| Comparative Example 1 | 97 | 3900 | 1.08 | 345 | 86 |
| Comparative Example 2 | 97 | 4000 | 1.09 | 350 | 87 |
| Comparative Example 3 | 97 | 4100 | 1.96 | 370 | 89 |
| Comparative Example 4 | — | 11200 | 1.12 | 320 | 64 | by YASUHARA CHEMICAL Co., Ltd., boiling point 215° C.). To the resulting solution, 80 g of silver powder (manufactured by MITSUI MINING & SMELTING Co., Ltd., average particle diameter 2 μm) was added, and then, the resulting mixture was mixed and stirred until it becomes homogeneous by a planetary mixing and defoaming machine to obtain a silver paste.

Evaluation of Sintering Property

The obtained silver paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 450° C. for 10 minutes in a muffle furnace. Thereafter, silver was recovered and carbon residue was measured by a total carbon/total sulfur measuring apparatus to yield a carbon content of 41 ppm (result is shown in Table 2).

Example 8

Production of Inorganic Fine Particle Dispersed Paste Composition 5 g of the terminally modified acrylic polymer obtained in Example 1 was dissolved in 10 g of toluene (manufactured by Wako Pure Chemical Industries, Ltd., boiling point 110° C.). To the resulting solution, 80 g of silver powder (manufactured by MITSUI MINING & SMELTING Co., Ltd., average particle diameter 2 μm) was added, and then, the resulting mixture was mixed and stirred until it becomes homogeneous by a planetary mixing and defoaming machine to obtain a silver paste.

Evaluation of Sintering Property

The obtained silver paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 300° C. for 30 minutes in a muffle furnace. Thereafter, silver was recovered and carbon residue was measured by a total carbon/total sulfur measuring apparatus to yield a carbon content of 68 ppm (result is shown in Table 2).

Example 9

Production of Inorganic Fine Particle Dispersed Paste Composition 5 g of the terminally modified acrylic polymer obtained in Example 2 was dissolved in 10 g of terpineol (manufactured by YASUHARA CHEMICAL Co., Ltd., boiling point 215° C.). To the resulting solution, 20 g of phosphor powder (manufactured by NICHIA Corp., particle diameter 3 μm) was added, and then, the resulting mixture was mixed and stirred until it becomes homogeneous by a planetary mixing and defoaming machine to obtain a phosphor paste.

Evaluation of Sintering Property

The obtained phosphor paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 300° C. for 30 minutes in a muffle furnace. Thereafter, the phosphor powder was recovered and carbon residue was measured by a total carbon/total sulfur measuring apparatus to yield a carbon content of 56 ppm (result is shown in Table 2).

Example 10

Production of Inorganic Fine Particle Dispersed Paste Composition 5 g of the terminally modified acrylic polymer obtained in Example 4 was dissolved in 10 g of terpineol (manufactured by YASUHARA CHEMICAL Co., Ltd., boiling point 215° C.). To the resulting solution, 20 g of green phosphor powder (manufactured by NICHIA Corp., particle diameter 3 μm) was added, and then, the resulting mixture was mixed and stirred until it becomes homogeneous by a planetary mixing and defoaming machine to obtain a phosphor paste.

Evaluation of Sintering Property

The obtained phosphor paste was printed on a glass plate by using a printing screen with a pattern of line and space of 50 μm/100 μm in width and 5 cm in length and a screen printing machine. As the results of printing, a line pattern of line and space of 63 μm/88 μm in width was achieved. The resulting printed matter was dried at 120° C. for 10 minutes in an oven to remove a solvent, and the terminally modified acrylic polymer was decomposed and burnt at 300° C. for 30 minutes in a muffle furnace. Thereafter, the green phosphor powder was recovered and carbon residue was measured by a total carbon/total sulfur measuring apparatus to yield a carbon content of 68 ppm (result is shown in Table 2).

Example 11

Production of Inorganic Fine Particle Dispersed Paste Composition 5 g of the terminally modified acrylic polymer obtained in Example 4 was dissolved in 10 g of terpineol (manufactured by YASUHARA CHEMICAL Co., Ltd., boiling point 215° C.). To the resulting solution, 20 g of glass frits ("ABX 169F" manufactured by Tokan Material Technology Co., Ltd., melting point 464° C., particle diameter 2.5 μm) was added, and then, the resulting mixture was mixed and stirred until it becomes homogeneous by a planetary mixing and defoaming machine to obtain a glass paste.

Evaluation of Sintering Property

The obtained glass paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 300° C. for 30 minutes in a muffle furnace. Thereafter, the glass frits were recovered and carbon residue was measured by a total carbon/total sulfur measuring apparatus to yield a carbon content of 71 ppm (result is shown in Table 2).

Example 12

Production of Inorganic Fine Particle Dispersed Paste Composition

A metal oxide paste was obtained in the same manner as in Example 11 except for using 20 g of ITO powder (manufactured by Aldrich Chemical Co., average particle diameter 0.03 μm) in place of 20 g of glass frits.

Evaluation of Sintering Property

The obtained metal oxide paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 300° C. for 30 minutes in a muffle furnace. Thereafter, ITO was recovered and carbon residue was measured by a total carbon/total sulfur measuring apparatus to yield a carbon content of 59 ppm (result is shown in Table 2).

Example 13

Production of Inorganic Fine Particle Dispersed Paste Composition

A metal oxide paste was obtained in the same manner as in Example 11 except for using 20 g of ZnO powder (manufactured by Aldrich Chemical Co., average particle diameter 1 μm) in place of 20 g of glass frits.

Evaluation of Sintering Property

The obtained metal oxide paste was applied onto a glass plate so as to be 10 μm in thickness with an applicator. The resulting applied substance was dried at 120° C. for 10 minutes in an oven to remove a solvent, and the terminally modified acrylic polymer was decomposed and burnt at 300° C. for 30 minutes in a muffle furnace. Thereafter, ZnO was recovered and carbon residue was measured by a total carbon/total sulfur measuring apparatus to yield a carbon content of 67 ppm (result is shown in Table 2).

Comparative Example 5

Production of Inorganic Fine Particle Dispersed Paste Composition 5 g of the acrylic polymer obtained in Comparative Example 1 was dissolved in 10 g of toluene (manufactured by Wako Pure Chemical Industries, Ltd., boiling point 110° C.). To the resulting solution, 80 g of silver powder (manufactured by MITSUI MINING & SMELTING Co., Ltd., average particle diameter 2 μm) was added, and then, the resulting mixture was mixed and stirred until it becomes homogeneous by a planetary mixing and defoaming machine to obtain a silver paste.

Evaluation of Sintering Property

The obtained silver paste was applied onto a glass plate so as to be 10 μm in thickness with an applicator. The resulting applied substance was dried at 120° C. for 10 minutes in an oven to remove a solvent, and the acrylic polymer was decomposed and burnt at 300° C. for 30 minutes in a muffle furnace. Thereafter, silver was recovered and carbon residue was measured by a total carbon/total sulfur measuring apparatus to yield a carbon content of 1400 ppm (result is shown in Table 2).

TABLE 2

| | Carbon residue (PPM) |
|---|---|
| Example 6 | 32 |
| Example 7 | 41 |
| Example 8 | 68 |
| Example 9 | 56 |
| Example 10 | 68 |
| Example 11 | 71 |
| Example 12 | 59 |
| Example 13 | 67 |
| Comparative Example 5 | 1400 |

INDUSTRIAL APPLICABILITY

In accordance with the present invention, it is possible to provide a terminally modified acrylic polymer having excellent thermal decomposition properties at low temperatures, an inorganic fine particle dispersed paste composition obtained by using the terminally modified acrylic polymer and a method of producing of the terminally modified acrylic polymer.

The invention claimed is:

1. An inorganic fine particle dispersed paste composition, which comprises a terminally modified acrylic polymer, an organic solvent, and an inorganic fine particle, wherein the terminally modified acrylic polymer comprises a main chain composed of a repeating unit represented by the following formula (1), and a group represented by the following formula (2) at both ends or at one end of the main chain, wherein $R^1$ represents a hydrogen atom or an alkyl group having 1 to 8 carbon atoms;
$R^2$ represents an alkyl group having 1 to 8 carbon atoms;
$R^3$ and $R^4$ each represents a hydrogen atom or a carbon-containing group selected from the group consisting of a methyl group, an ethyl group, an n-propyl group, an isopropyl group, a cyclopropyl group, an n-butyl group, a sec-butyl group, a tert-butyl group, an isobutyl group, a cyclobutyl group, an n-pentyl group, an n-hexyl group, a cyclohexyl group, an n-heptyl group, an n-octyl group, a 2-ethylhexyl group, an n-nonyl group, an n-dodecyl group, a behenyl group, a stearyl group, an isomyristyl group, an isoboronyl group, a phenyl group, a benzyl group, a 2-hydroxyethyl group, a 2-hydroxypropyl group, a 2,3-dihydropropyl group, a 4-hydroxybutyl group, a 4-hydroxymethyl group, a phenyl group, a 4-methylphenyl group, a 3-methylphenyl group, a 2-methylphenyl group, a 4-hydroxyphenyl group, a 4-acetoxyphenyl group and a 4-tert-butoxyphenyl group; and n represents a positive integer.

2. The inorganic fine particle dispersed paste composition according to claim 1, wherein the terminally modified acrylic polymer comprises a segment derived from a methacrylic ester.

3. The inorganic fine particle dispersed paste composition according to claim 1, wherein $R^3$ and $R^4$ each is a hydrogen atom.

4. The inorganic fine particle dispersed paste composition according to claim 1, wherein the number average molecular weight of the terminally modified acrylic polymer is 2,000 to 500,000.

5. The inorganic fine particle dispersed paste composition according to claim 1, wherein the organic solvent has a boiling point of 100 to 290° C. at 1 atm.

6. The inorganic fine particle dispersed paste composition according to claim 1, wherein the inorganic fine particle is a glass frit, a phosphor powder, a silver powder, a copper powder, an ITO powder, a zinc oxide powder or a carbon powder.

* * * * *